(12) United States Patent
Gardiner

(10) Patent No.: US 11,508,052 B2
(45) Date of Patent: Nov. 22, 2022

(54) SYSTEMS AND METHODS FOR QUANTIFYING LIGHT FLARES IN IMAGES

(71) Applicant: Argo AI, LLC, Pittsburgh, PA (US)

(72) Inventor: Koji L. Gardiner, San Francisco, CA (US)

(73) Assignee: ARGO AI, LLC, Pittsburgh, PA (US)

( * ) Notice: Subject to any disclaimer, the term of this patent is extended or adjusted under 35 U.S.C. 154(b) by 110 days.

(21) Appl. No.: 17/017,654

(22) Filed: Sep. 10, 2020

(65) Prior Publication Data
US 2022/0076401 A1    Mar. 10, 2022

(51) Int. Cl.
G06T 7/00 (2017.01)
G06T 7/70 (2017.01)
G06T 3/60 (2006.01)
G06T 11/60 (2006.01)

(52) U.S. Cl.
CPC ........... *G06T 7/0002* (2013.01); *G06T 3/60* (2013.01); *G06T 7/70* (2017.01); *G06T 11/60* (2013.01); *G06T 2207/20076* (2013.01); *G06T 2207/20224* (2013.01)

(58) Field of Classification Search
CPC ........... G06T 7/0002; G06T 3/60; G06T 7/70; G06T 11/60
USPC ....................................................... 382/100
See application file for complete search history.

(56) References Cited

U.S. PATENT DOCUMENTS

| | | |
|---|---|---|
| 7,006,210 B2 | 2/2006 | Overbeck et al. |
| 9,230,310 B2 | 1/2016 | Black et al. |
| 9,979,909 B2 | 5/2018 | Kuang et al. |
| 10,298,863 B2 | 5/2019 | Silverstein et al. |
| 10,382,712 B1 | 8/2019 | Forutanpour et al. |
| 2009/0273843 A1 | 11/2009 | Raskar et al. |
| 2011/0242352 A1 | 10/2011 | Hikosaka |
| 2013/0063788 A1 | 3/2013 | Iwayama et al. |
| 2013/0329132 A1 | 12/2013 | Tico et al. |
| 2017/0070689 A1* | 3/2017 | Silverstein ........... H04N 5/3651 |
| 2017/0243373 A1 | 8/2017 | Bevensee et al. |
| 2018/0255254 A1 | 9/2018 | Kuang et al. |
| 2019/0260978 A1* | 8/2019 | Guérin ................... H04N 5/232 |

(Continued)

OTHER PUBLICATIONS

F. Chabert. "Automated Lens Flare Removal", Stanford University, 2015, pp. 1-4, Stanford University, United States.

(Continued)

*Primary Examiner* — Ayodeji O Ayotunde
(74) *Attorney, Agent, or Firm* — Brooks Kushman P.C.

(57) ABSTRACT

Systems, methods, and computer-readable media are disclosed for identifying light flares in images. An example method may involve receiving an image from an imaging device, the image including data indicative of a flare artifact originating from a region of the image. The example method may also involve determining, based on the image data, a first array of pixels extending radially outwards from the region and a second array of pixels extending radially outwards from the region. The example method may also involve creating, based on the image data, a flare array, the flare array including the first array of pixels and the second array of pixels. The example method may also involve determining, based on the flare array, a peak flare artifact value indicative of a size of the flare artifact. The example method may also involve determining, based on the peak flare artifact value, a flare artifact score for the imaging device.

20 Claims, 6 Drawing Sheets

(56) References Cited

U.S. PATENT DOCUMENTS

2019/0356873 A1* 11/2019 Douady-Pleven ............................ H01L 27/14623
2021/0035146 A1* 2/2021 Odom ................ G06Q 30/0226

OTHER PUBLICATIONS

Vitoria et al. "Automatic Flare Spot Artifacts Detection and Removal in Photographs", Journal of Mathematical Imaging and Vision, May 2019, pp. 1-20, vol. 61, Spain.
International Search Report & Written Opinion of PCT/US2021/049840 dated Dec. 28, 2021, 10 pages.

* cited by examiner

SYSTEMS AND METHODS FOR QUANTIFYING LIGHT FLARES IN IMAGES

BACKGROUND

Light flare artifacts may arise in imaging devices (for example, cameras) when a strong light source is within a field of view or slightly outside of the field of view of a lens of the imaging device. Light received by the imaging device may bounce around optics within the imaging device and may interact with defects in the imaging device. These interactions may result in artifacts being detected by the camera or imaging device that don't actually exist in the environment. The artifacts are commonly seen as streaks of light extending radially outwards from the light source (however, radial steaks may only be one example of a type of flare artifact, and several other types of flare artifacts may also exist, such as circular flares). These artifacts may be especially detrimental for machine vision systems because the underlying algorithms of the machine vision systems may detect the artifacts in image captures and falsely believe that the artifacts actually exist in the environment. Additionally, such flares can manifest themselves in a number of different ways and conventional systems may not be able to determine a quantitative metric for determining how pronounced the light flares produces by one imaging device are relative to another imaging device.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
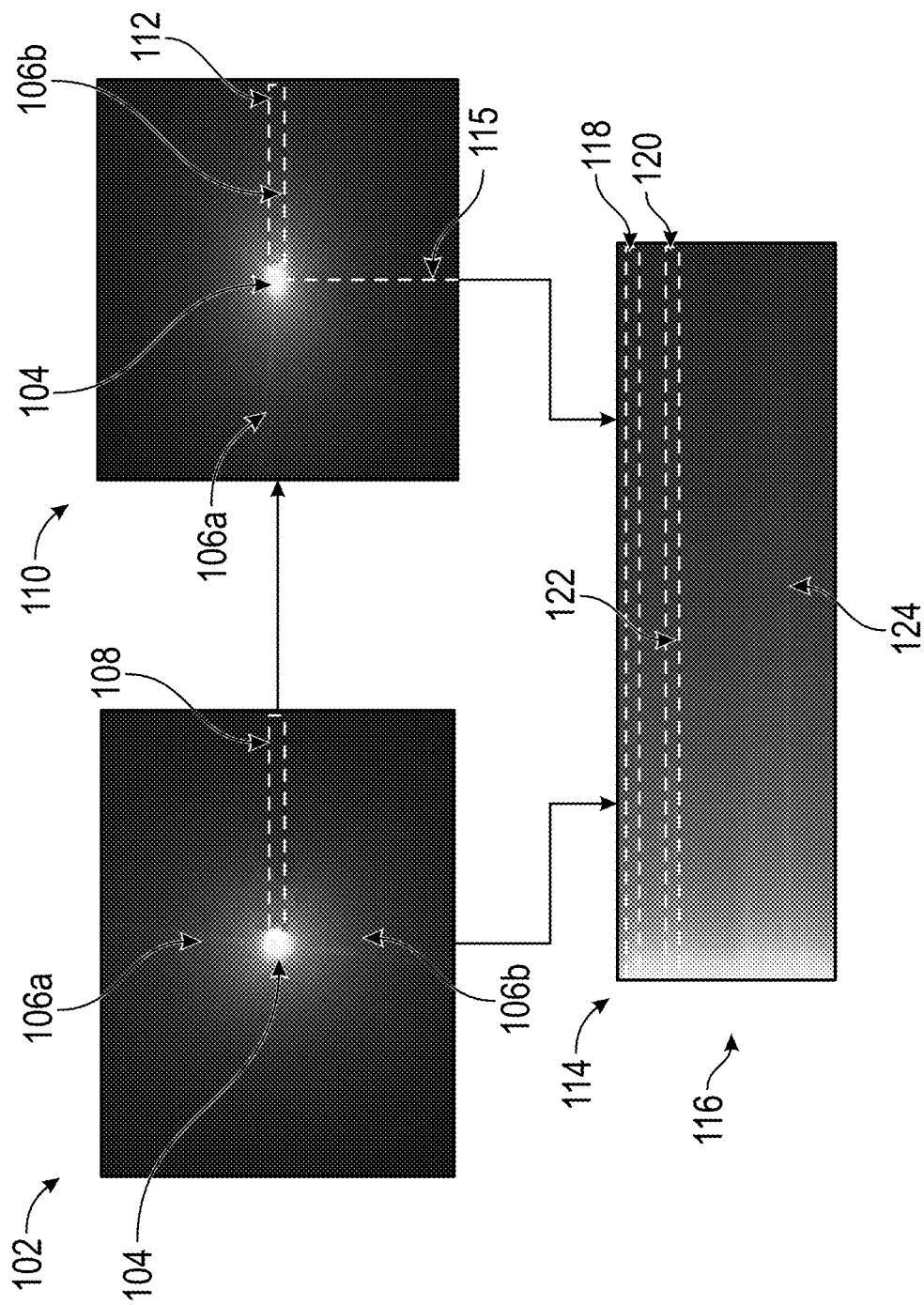
FIGS. 1A-1C depict an example flare artifact identification process, in accordance with one or more example embodiments of the disclosure

This disclosure relates to, among other things, systems and methods for identifying light flare artifacts in images. More particularly, the systems and methods described herein may be used to develop metrics for determining how pronounced the light flare artifacts produced by one imaging device are relative to the light flare artifacts produced by another imaging device (it should be noted that the terms "imaging device" and "imaging devices" may be used interchangeably herein). An imaging device may be, for example a camera or any other system or device that is capable of capturing an image. In one specific implementation, the systems and methods described herein may be associated with cameras used in conjunction with autonomous vehicle systems, however the systems and methods described herein may similarly be applied in any other context an imaging device may be used as well. The metrics developed through these systems and methods may allow the flare artifacts produced by individual imaging devices to be quantified relative to one another. This may be beneficial in that a system that utilizes one or more of such imaging devices (for example, an autonomous vehicle system as mentioned above) can be quality tested to ensure that each individual imaging device is performing to a particular standard For example, quality tested to ensure that an imaging device satisfies a pre-determined metric threshold. In some instances, metric threshold may involve an indication of an amount and/or magnitude of flare artifacts produced by the imaging device. The metrics may also provide other information about flare artifacts, such as the symmetry and/or asymmetry of the flare artifacts, as well as the intensity and/or contrast of the flare artifacts. The testing may also be used on a more individual level instead of a system level. That is, the systems and methods could be applied to test the level of flare artifacts produced by an individual imaging device, where the resulting metric may be compared to predetermined threshold metric values. For example, if the resulting metric score is determined to be above the threshold (for example, if the metric defined the amount of flare produced), it may be determined that the imaging device's performance is insufficient and produces too pronounced of flare artifacts to be usable. In some cases however, depending on the metric, the determination may be if the resulting score falls below a threshold as well.

In some embodiments, the systems and methods described herein may also be beneficial in that the information produced about the flare artifacts for different imaging devices may be used in real-time for any number of purposes. For example, in the autonomous vehicle context, the information may be used to provide an indication to the autonomous vehicle machine vision systems to ignore the flare artifacts in the image so that the flare artifacts are not treated as actually existing in the environment. As another example, the information may be used to determine cleanliness of a lens of an imaging device. Contaminants such as dirt, smudges, and/or water on lenses can result in a form of "streak" artifact in the presence of strong light sources in a scene (For example, which can be compared to a situation where a person points a smartphone camera at the sun and streaks may be visible if there is a fingerprint on the camera window). In this situation, a real-time algorithm employing the method described herein could prompt the user to clean their lens. If the lens is on a vehicle (such as an autonomous vehicle), the real-time algorithm could trigger a cleaning mechanism on the vehicle.

In some embodiments, the process may begin with the system receiving one or more images captured by a particular imaging device (in some cases, one or more images may also be in the form of a video or a real-time stream of data). The one or more images may include one or more images of a particular region in an environment, and the region may include a light source (for example, the sun) or other object that may be capable of producing flare artifacts in an image captured by the imaging device. In some cases, the one or more images may include multiple images of the region within at environment at different orientations with respect to the region. For example, the system may capture three images at orientations of −20, 0, and 20 degrees from an angle of incidence. More than one orientation may be captured through the one or more images because flare artifacts may change depending on the location of the light source. For example, if the methods described herein are applied to multiple images at different orientations, the resulting metrics for each orientation may be sorted in order. The image with the highest resulting value (or lowest, depending on the metric used) can then be used as the resulting score for that particular imaging device. Again, flare artifacts can be orientation dependent, so it may be beneficial to take multiple images at multiple orientations and determine different metrics at these orientations to determine the level of flare artifacts produced by the imaging device in a worst case scenario. Although more than one orientation may be captured and processed in a manner as will be described below, for simplicity sake, the below descriptions may only exemplify the processing that may be performed on one of the images. The process described below may also similarly be applied to any number of additional images at any given orientation, and may be applied using only one image at one orientation with respect to the region of interest. In some embodiments, once the image is received from the imaging device, the next step of the process may involve thresholding the image to create a binary map of the image. In some cases, however, before this step of the process is performed, if the image is a color image, then it may be desirable to convert it into a greyscale image. This may simplify the creation of the binary map described below. Thresholding the image may involve identifying every pixel in the image with an associated value that satisfies a particular threshold. In conventional imaging, pixels may be stored as an 8-bit integer, which may provide a range of possible pixel values from 0 to 255. In a greyscale image, 0 may be representative of a pure black pixel, and 255 may be representative of a pure white pixel. Given this, an example threshold that may be used may be 240. In some instances then, satisfying the pixel threshold may entail a pixel having a value of 240 and above, and failing to satisfy the threshold may entail a pixel having a value of below 240. The threshold may not necessarily be limited to 240, but may be also be any other predetermined pixel value. Furthermore, the threshold may be adaptive in real-time, and may change from a first time to a second time. Additionally, satisfying the threshold may not necessarily be limited to a pixel value of at the threshold and below, but may also involve a pixel value below the threshold or any of the other possibilities with respect to the threshold (above the threshold, etc.). The same may apply to the failing to satisfy the threshold condition. Once the thresholding is completed, the image may be converted into a binary map. A binary map may be a representation of the image in which each pixel may be associated with a value of either 1 or 0. Pixels that satisfy the threshold as described above may be provided a binary value of 1. Pixels that do not satisfy the threshold may be provided a binary value of 0. Thresholding the image and creating the binary map may be used to localize the light source within the image. Once the binary map is established, it may be used to determine the centroid of the light source in the image. The purpose of identifying the centroid may be to determine the center of the light source. The centroid of the light source may be identified by first determining which pixels of the binary map of the image are associated with a pixel value of 1. These pixels may be the pixels of the binary map that may be associated with the light source of the original image received from the imaging device. The centroid of the shape formed by the pixels may then be determined. The centroid of the shape formed by the pixels may be determined through a number of different methods. For example, a Hough transform for circle detection may be used. However, any other method for determining a centroid of a shape may also similarly be used.

In some embodiments, the steps performed after the centroid is determined may be performed on the original greyscale image with pixel values of 0 to 255 instead of the binary image with pixel values of 0 and 1 used to determine the centroid. once the centroid of the light source is determined, the binary map of the image may be zero-padded. Zero-padding the image may involve adding additional pixels with a value of zero to the image to enlarge the image in a particular direction. In this case, the zero padding may be performed to ensure that the light source is located in the center of the image. For example, if the light source is originally located closer to the right hand side of the image, then pixels with a value of zero may be added to the right hand side of the image to match the number of pixels with a value of zero to the left hand side of the light source in the image. More specifically, the centroid determination may provide row and column coordinates for the light source of the image. These coordinates may be used to determine how many rows and columns need to be padded into the image such that the light source is located in the center of the image. This zero padding may be performed to simplify subsequent processing steps. For example, subsequent steps may rotate the image progressively and calculate a metric at each rotation. Knowing that the light source will remain at the center of the image after each rotation may be important to simplify the calculation of the metrics described later. Rotating an image with the light source at an offset position—may cause the center of the light source to shift position after each rotation, which may make it complicated to follow.

Figure 1B:
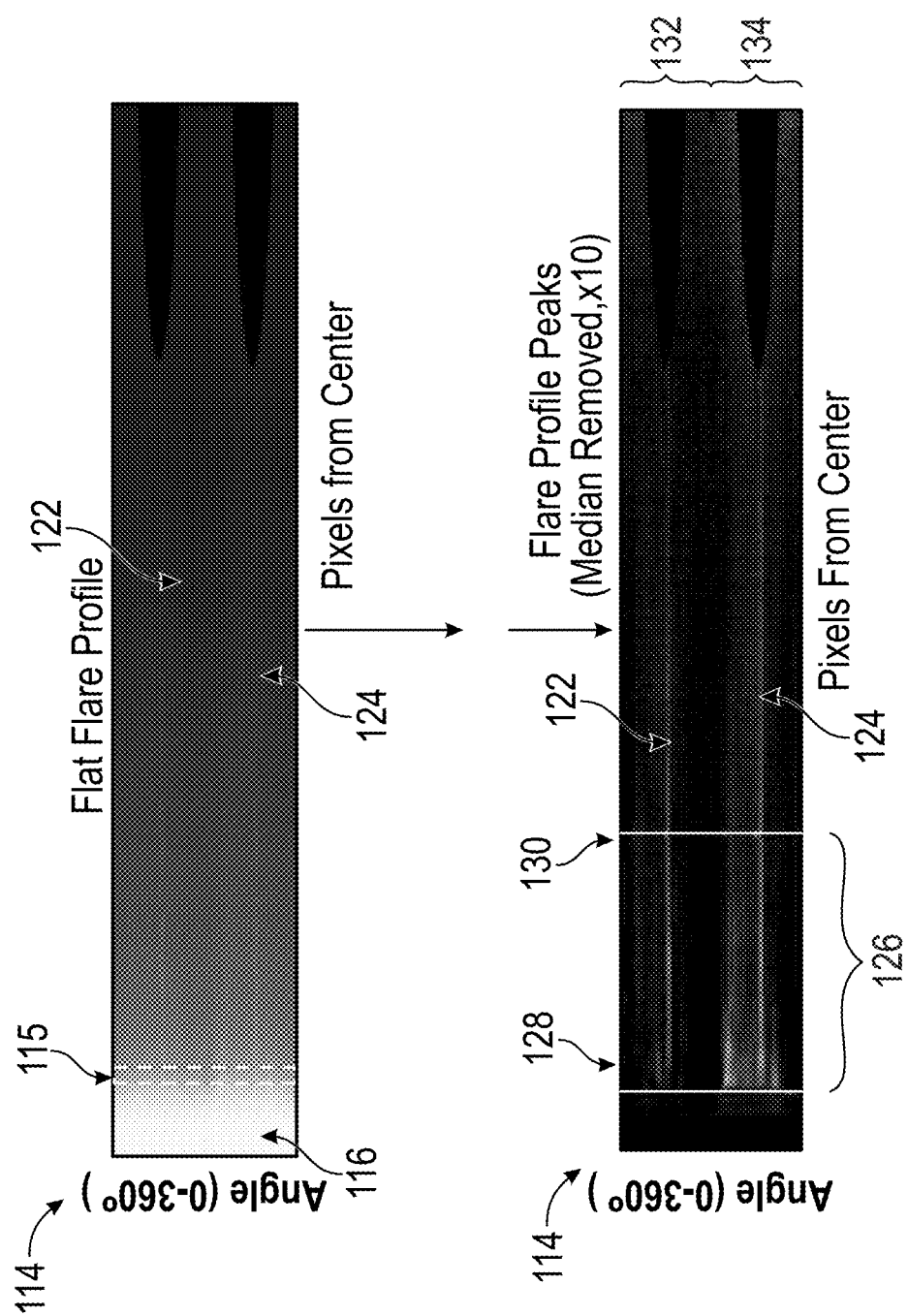

In some embodiments, once the zero padding is performed on the image, a flare profile array of the image may be created. A flare profile array may be another image (for example, a transformation of the originally-captured image) that may be a representation of the image received by the imaging device in which all of the pixels extending radially outwards from the light source as translated into horizontal rows of pixels stacked on top of one another in the flare profile array. For example, if the image may represent a grouping of pixel arrays extending radially outwards from the light source over 360 degrees, then a first pixel array may represent a single row on the flare profile array, a second pixel array in the same location as the first pixel array with the image rotated by 1 degrees may represent another row on the flare profile array, and so on. This flare profile array may be better illustrated with respect to FIGS. 1A-1B described below. The result of the flare profile array may be a representation in which the light source may be located on one side of the image and the flare artifacts may extend horizontally outwards from the light source in one direction (for example horizontally and to the right as depicted in FIGS. 1A-1B) instead of extending radially outwards from the light source as in the original image. This may allow for easier processing of the flare artifacts to determine a peak of the largest flare artifact in the image. This peak may subsequently be used to determine a metric quantifying the level of flare artifacts produced by the imaging device that captured the original image.

In some embodiments, in order to create the flare profile array from the image, each of the arrays of pixels extending radially outward from the light source may be extracted individually. Beginning with the array of pixels extending outward from the centroid of the light source at the center of the image (after zero padding) horizontally to the edge of the image (for example, as depicted in FIG. 1A), each of the arrays of pixels may extracted by incrementally rotating the image in a counterclockwise or clockwise direction by a single degree of rotation after each subsequent pixel array is extracted. This may be performed until all of the pixels of the image have been extracted and added to the flare profile array. For example, the array of pixels extending outward from the centroid of the light source at the center of the image may be extracted and added to the flare profile array as a first row. The zero-padded image may then be rotated by a single degree such that the array of pixels that was adjacent to the original array of pixels extending outward from one side of the light source at the center of the image may then take the place of the array of pixels extending outward from one side of the light source at the center of the image. This array of pixels may then be extracted and added to the flare profile array as a second row of pixels underneath the first row of pixels on the flare profile array. This process may continue until all of the pixels on the image have been translated into rows of pixels on the flare profile array. Again, this process may be better visualized through FIG. 1A described below. This process of extracting arrays of pixels may be a form of remapping the original image from Cartesian (x,y) coordinates to polar coordinates (radius, theta).

In some embodiments, once the flare profile array has been created for the image, processing of the flare profile array may be performed. The processing of the flare profile array may first involve, for each column of pixels in the flare profile array (a column of pixels may be, for example, one pixel wide, or may alternatively be multiple pixels wide), extracting a median pixel brightness. The median pixel brightness may be a median pixel value in the column. For example, the median pixel value may be a value between 0 and 255 because the potential pixel values may range from 0 to 255. This median brightness may then be subtracted from the column of the flare profile array. Subtracting the median brightness may involve subtracting the median brightness value from each pixel value in the image. Taking the median of each of the columns may equate to taking the median of concentric circles around the light source in the original image. Subtracting the median brightness from each column may serve to remove the effect of any background change. Removing the effect of background change may refer to separating the higher frequency, "streaky" flare from lower frequency background glare (what is often termed "veiling glare"). This step may serve to remove the background or bias and only allow the "streaks" to remain.

In some embodiments, once the median has been subtracted from each column (for example, each pixel of each column) of the flare profile array, a flare artifact score may be determined for the imaging device that captured the originally-received image (or multiple images at multiple orientations) including the light source. Determining the flare artifact score may involve first determining a region of the flare profile array to analyze (an example of such a region may be depicted as the bounded box in FIG. 1B as described below). The region of the flare profile array may be chosen such that the left hand side of the flare profile array where the pixels representing the light source may not be included within the region. This may be because the focus of the flare artifact determination should focus on the flare artifacts themselves. The light source should be relatively consistent in any images captured by any imaging device, and only the flare artifact produced by the light source in the imaging device may be of concern. The right hand side of the region of the flare profile array may also be chosen such that a plot of the flare artifacts in the original image (an example of such a plot may be depicted in FIG. 1C as described below) is properly scaled so that the flare artifacts may be identified relative to extraneous noise in the image. For example, if the right hand side of the region is extended too far outwards, then a peak of the largest flare artifact may appear to be closer in magnitude to the remainder of the plot. However, if the right hand side of the region does not capture all of the flare artifact, then the peak may not be able to be determined. The region may also extend vertically to cover the entirety of the flare profile array, such as depicted in FIG. 1B. Once the region is determined, a mean brightness (pixel value) may be determined for each row of the flare profile array found within the region. This information may then be plotted to determine the flare artifact score for the imaging device. The plot may include an x-axis representing degrees of rotation (which may correspond to subsequent rows of the flare profile array) and a y-axis representing a mean brightness value in each row of the flare profile array. That is, the mean pixel brightness for each row in the flare profile array may be plotted. Each row in the flare profile array may be representative of a degree (for example, 0 to 360) in the original image, so the location of a corresponding row's mean brightness value on the plot may depend on the row's associated degree value. From this plot, the flare artifact score may be determined by finding the peak of the plot (for example, the largest pixel brightness value found on the plot). The peak of the plot may represent the magnitude of the largest flare artifact in the image. Additionally, because flare artifacts may exhibit symmetries with respect to the light source (for example, one flare artifact may extend vertically upward from the light source, and a corresponding flare artifact may extend vertically downward from the light source, 180 degrees apart), the plots from 0 to 180 degrees and 180 degrees to 360 degrees may be similar or identical. Given this, the plot may be consolidated by including the plots from 0 to 180 degrees and 180 degrees to 360 degrees on top of one another rather than plotting from 0 degrees all the way to 360 degrees. For example, the 0 to 180 degrees and 180 degrees to 360 degrees plots can be overlaid on top of each other, or the sum of the scores of these two plots can be determined and the result may be plotted as well.

In some embodiments, the flare artifact score may be used for a number of purposes. For example, the flare artifact score may be used to identify how individual imaging devices perform relative to one another in terms of producing flare artifacts in images. This data may be provided to a manufacturer or supplier of the imaging device so that they may make appropriate changes to the imaging device in order to reduce the flare artifacts produced by the imaging device. For example, the manufacturer or supplier may need to clean optical surfaces like the sensor cover glass or lenses. If these approaches do not resolve the issue they may need to dig into deeper root cause. For example, these flares may be caused by microscopic abrasions on an optical coating that resulted from an unapproved manufacturing process. This may be especially beneficial in systems in which having accurate imaging information may be critical. For example, for use in autonomous vehicle systems in which the autonomous vehicle needs to receive accurate information that is representative of actual elements that exist in an environment in order to correctly navigate the environment. The flare artifact score and any of the processing described herein to determine the flare artifact score may also be used in real-time by systems relying on imaging devices producing the flare artifacts. For example, through the processing the systems may be able to identify the location and intensities of the flare artifacts, and use this information to filter data collected by the imaging device. Additionally, as described above, the score may be used to determine cleanliness of a lens of an imaging device. Contaminants such as dirt, smudges, and/or water on lenses can result in a form of "streak" artifact in the presence of strong light sources in a scene (For example, which can be compared to a situation where a person points a smartphone camera at the sun and streaks may be visible if there is a fingerprint on the camera window). In this situation, a real-time algorithm employing the method described herein could prompt the user to clean their lens. If the lens is on a vehicle (such as an autonomous vehicle), the real-time algorithm could trigger a cleaning mechanism on the vehicle.

Figure 1C:
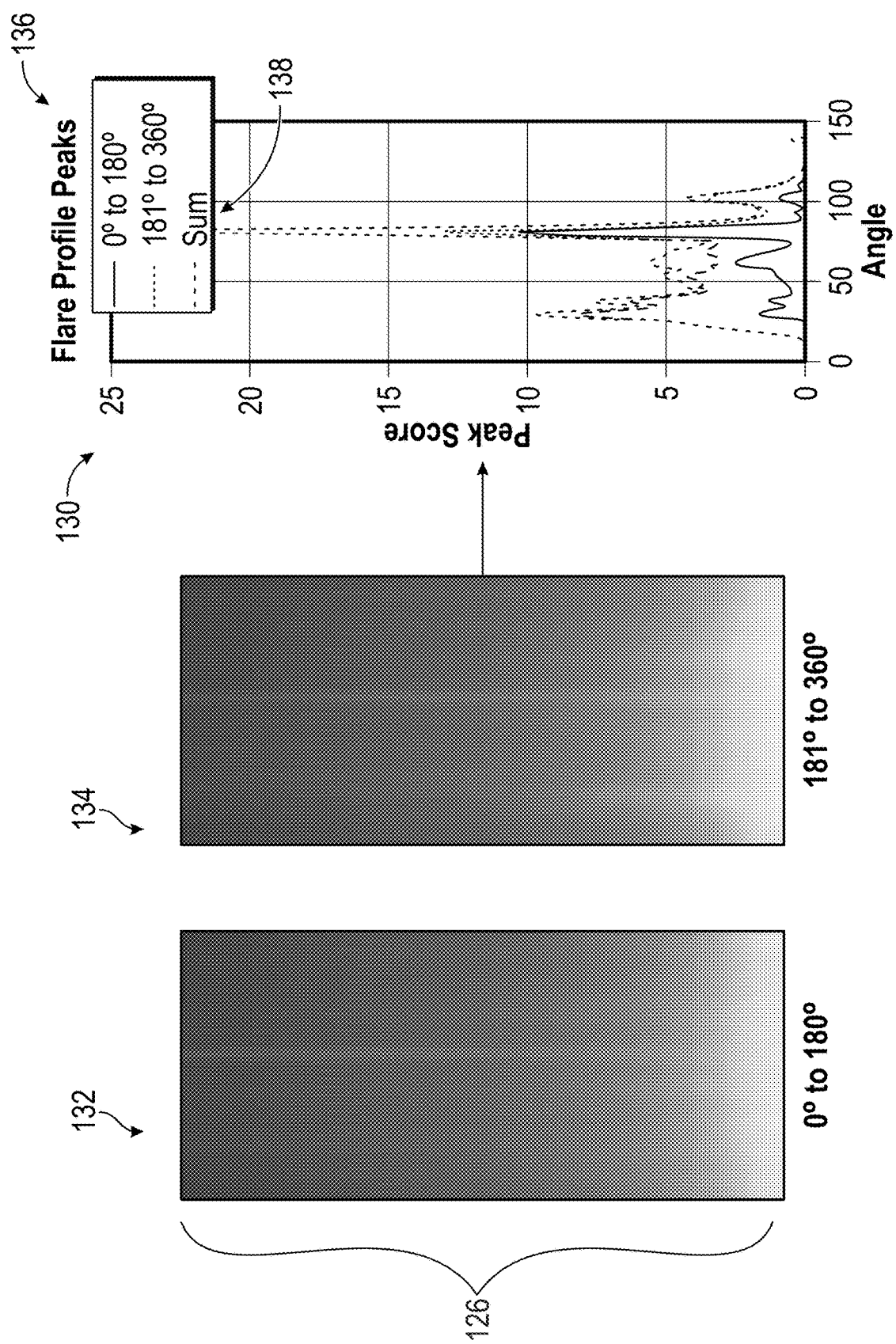

With reference to the figures, FIGS. 1A-1C depict an example flare artifact identification process, which may be, for example, the same as or similar to the methods for identifying light flare artifacts in images as described above. In particular, FIG. 1A may depict a portion of the process in which a first image 102 received from an imaging device (not shown in the figure) may be converted into a flare profile array 114. In some embodiments, the first image 102 may be an image that is captured by the imaging device and may serve as the basis for determining the level of flare artifacts created in images captured by the imaging device. The first image 102 may include a light source 104 that may serve as an origination point for one or more flare artifacts (for example, flare artifact 106a and flare artifact 106b, or any other number of flare artifacts. Flare artifacts (which may be referred to as "lens flare," "light flare artifacts," "flare artifacts," or the like herein) may result when light received by the imaging device bounces around the optics within the imaging device and may interacts with defects within the optics of the imaging device. These interactions may result in artifacts being detected by the camera or imaging device that don't actually exist in the environment. Additionally, the light source may be any element in the environment being captured in the first image 102 taken by the imaging device that is capable of producing light. Some possible examples may include the sun, a streetlight, a vehicle headlight, among many other elements that are capable of producing light that may be captured by the imaging device.

In some embodiments, as described above, the process may involve converting the first image 102 into the flare profile array 114 so that a flare artifact peak may be determined. The flare peak may allow a flare artifact score to then be determined for the imaging device. In order to convert the first image 102 into the flare profile array 114, each row of pixels extending radially outwards from the light source 104 may be translated to the horizontal rows shown in the flare profile array 114. Before this happens, the pre-processing of the first image 102 as described above may be performed. That is, the thresholding, binary map creation, and zero-padding, along with any other pre-processing steps, may be performed. Once the pre-processing is complete, the first image 102 may be converted to the flare profile array 114. Converting the first image 102 to the flare profile array 114 may begin by selecting a first pixel row 108 extending from the light source 104 of the first image 102 (for example, the center of the light source 104), which should be in the center of the first image 102 after the pre-processing of the first image 102, to the edge of the first image 102. The first pixel row 108 may extend in a horizontal manner as depicted in FIG. 1A, however, the first pixel row may alternatively be chosen as any other row of pixels, or multiple rows of pixels, extending radially outward from the light source 104 of the first image 102. The first pixel row 108 may be extracted from the first image 102 and added to a first horizontal pixel row 118 on the flare profile array 114. Once the first pixel row 108 is extracted from the first image 102 and added to the flare profile array 114, the first image 102 may then be rotated (for example rotated to be in the orientation depicted in the second image 110) so that a second pixel row 112 may be extracted from the first image 102 and added to the flare profile array 114 as a second horizontal pixel row 120. To better assist in the visualization of the rotation, imaginary axis 115 may represent the location of the first image 102 where the first pixel row 108 may be located. That is, the second image 110 may be the first image 102 rotated in a clockwise direction by 90 degrees (however, this rotation of 90 degrees between the first image 102 and the second image 110 may be merely exemplary to assist in the visualization of the rotation being performed. The pixels rows may actually be extracted through much smaller degrees of rotation, such as one degree of rotation per pixel row extraction as described herein). In some instances, the rotation performed after each successive pixel row extraction from the first image 102 may be one degree of rotation, or two or more degrees of rotation, as desired. This may allow adjacent pixel rows on the first image 102 to be extracted, until all of the desired pixel rows have been extracted from the first image 102 and added to the flare profile array 114 as horizontal rows of pixels. That is, the flare profile array 114 may be a horizontal arrangement of the rows of pixels extending radially outward from the center of the first image 102. For example, the entire left hand edge 116 of the flare profile array 114 may represent the light source 104 of the first image 102, and flare artifact 106a and flare artifact 106b in the first image 102 can be seen as flare artifact 122 and flare artifact 124, respectively, in the flare profile array 114. This means that several rows of pixels may have been added to the flare profile array 114 between the first pixel row 108 and the second pixel row 112.

In some embodiments, once the conversion from the first image 102 received by the imaging device to the flare profile array 114 is generated, any flare artifact peaks may be determined using the flare profile array 114. This may be depicted in FIG. 1B. Before the flare artifact peaks are determined, however, additional processing of the flare profile array 114 may be performed. In some instances, the additional processing of the flare profile array 114 may first involve, for each column in the flare profile array, extracting a median pixel brightness (for example, a median pixel value). An example of a column may be shown as column 125 in FIG. 1B. A column may represent a single vertically-oriented array of pixels in the flare profile array 114 (however, the column may also include multiple arrays of adjacent pixels). This median brightness may then be subtracted from the column of the flare profile array. Taking the median of each of the columns may equate to taking the median of concentric circles around the light source in the original image. Subtracting the median brightness from each column in the flare profile array 114 may serve to remove the effect of any background change. In some embodiments, once the median has been subtracted from each column of the flare profile array, the flare artifact peak may be determined for the imaging device that captured the first image 102 (depicted in FIG. 1A) including the light source 104 (for example, shown as 116 in FIG. 1B). Computing the flare artifact peak may involve first determining a region 126 of the flare profile array 114 to analyze. The region 126 of the flare profile array may be chosen such that the left hand side 128 of the flare profile array 114 where the pixels representing the light source (for example as shown at 116) may be found are not be included within the region 126. The right hand side 130 of the region of the flare profile array 114 may also be chosen such that a plot 136 (an example of which is depicted in FIG. 1C) of the flare artifacts in the original image is properly scaled so that the flare artifacts may be identified relative to extraneous noise or other portions of the image (for example, pixels of the image that are not of zero value, but may not be associated with a flare artifact).

In some embodiments, FIG. 1C may depict the region 126 separated from the portions of the flare profile array 114 that are not included within the region 126. FIG. 1C depicts two separate portions of the region 126. A first portion 132 may represent the pixel rows of the first image 102 from zero degrees to 180 degrees (the first image 102 rotated by 180 degrees) and a second portion 134 may represent the pixel rows of the first image 102 from 181 degrees to 360 degrees. As described above, because flare artifacts may exhibit symmetries with respect to the light source (for example, one flare artifact may extend vertically upward from the light source, and a corresponding flare artifact may extend vertically downward from the light source), the plots from 0 to 180 degrees and 180 degrees to 360 degrees may be similar or identical (which is the case in the first portion 132 and second portion 134 depicted in FIG. 1C). Given this, a plot 136 of the flare artifacts may be consolidated by including the plots from 0 to 180 degrees and 180 degrees to 360 degrees on top of one another rather than plotting from 0 degrees all the way to 360 degrees. From the plot, the flare artifact peak 138 may be determined. For example, in the plot 136 depicted in FIG. 1C, the flare artifact peak 138 may be approximately 22. This flare artifact peak 138 value of 22 may represent a flare artifact score for the imaging device that captured the first image 102. The flare artifact score may then serve as a metric for comparing the performance of various imaging devices relative to one another in terms of producing images with varying degrees of flare artifacts.

Figure 2:
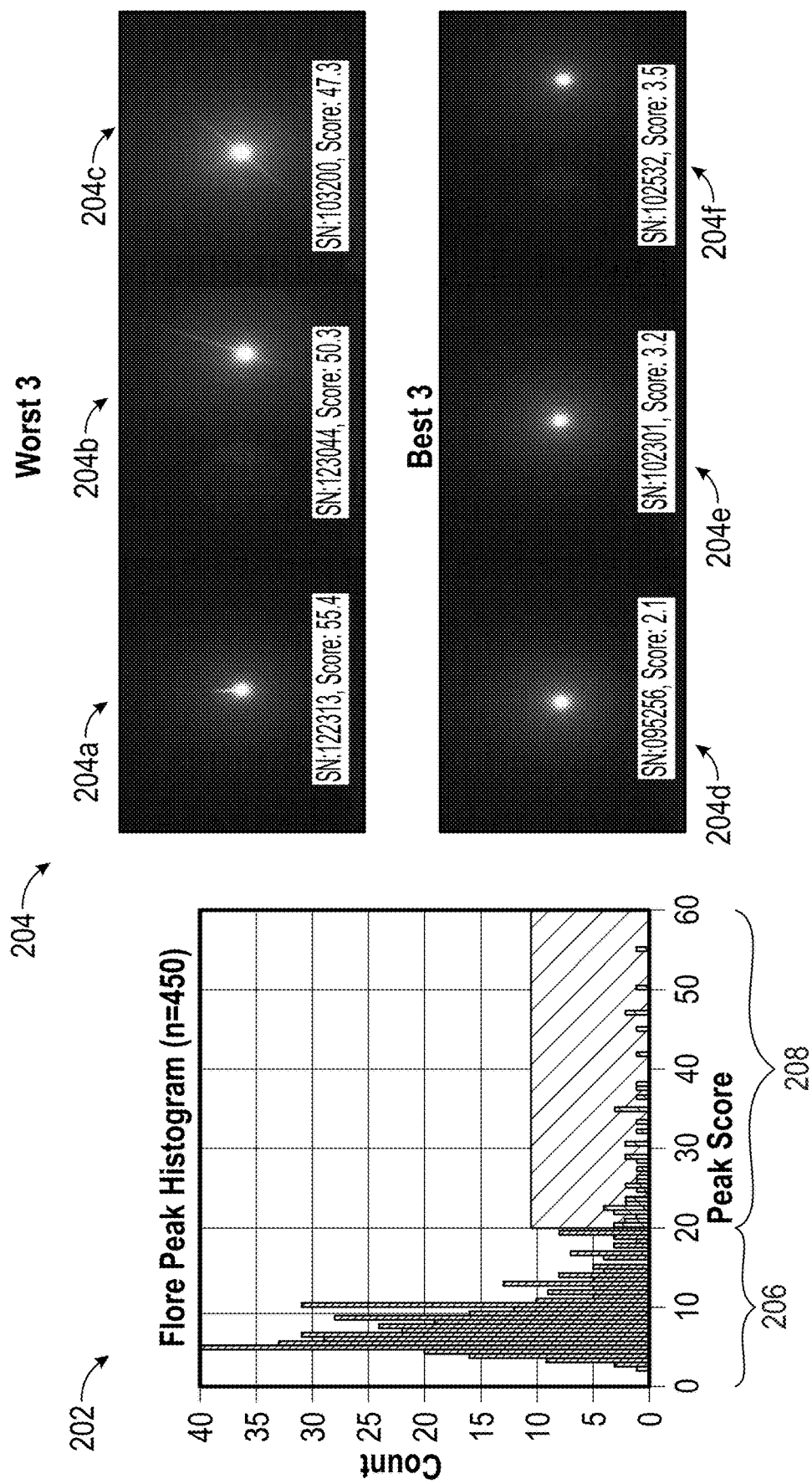
FIG. 2 depicts an example plot flare artifact scores for various imaging devices, in accordance with one or more example embodiments of the disclosure.

FIG. 2 depicts an example plot 202 that may be used to compare the flare artifact scores for various imaging devices. As described above, these flare artifact scores can be determined based on images 204 captured by the imaging devices. For example, images 204a-204f may show images captured by six different imaging devices that exhibit varying amount of flare artifacts, with 204a-204c including images with more pronounced flare artifacts and 204d-204f including images with less pronounced flare artifacts. Thus, the flare artifact scores for images 204a-204c may be larger than the flare artifact scores for the images 204d-204f. The plot 202 may depict such flare artifact scores of the respective images side by side so that a comparison of the relative performance of the imaging devices may be visualized. The particular plot 202 depicted in FIG. 2 may be a histogram, but any other type of plot may also be used as well. Within the plot 202, some of the flare artifact scores may be greater than the others. For example, a first grouping 206 of flare artifact scores may include smaller flare artifact scores than a second grouping 208 of scores. The second grouping 208 of flare artifact scores may be representative of a group of imaging devices that are more prone to capturing images with more pronounced flare artifacts than the imaging devices associated with the first grouping 206 of flare artifact scores. For example, the second grouping 208 of flare artifact scores may more likely be associated with the imaging devices that captures images 204a-204c than images 204d-204f, although the flare artifact scores associated with images 204a-204f may not necessarily correspond to the flare artifact scores depicted in plot 202.

Illustrative Method

Figure 3:
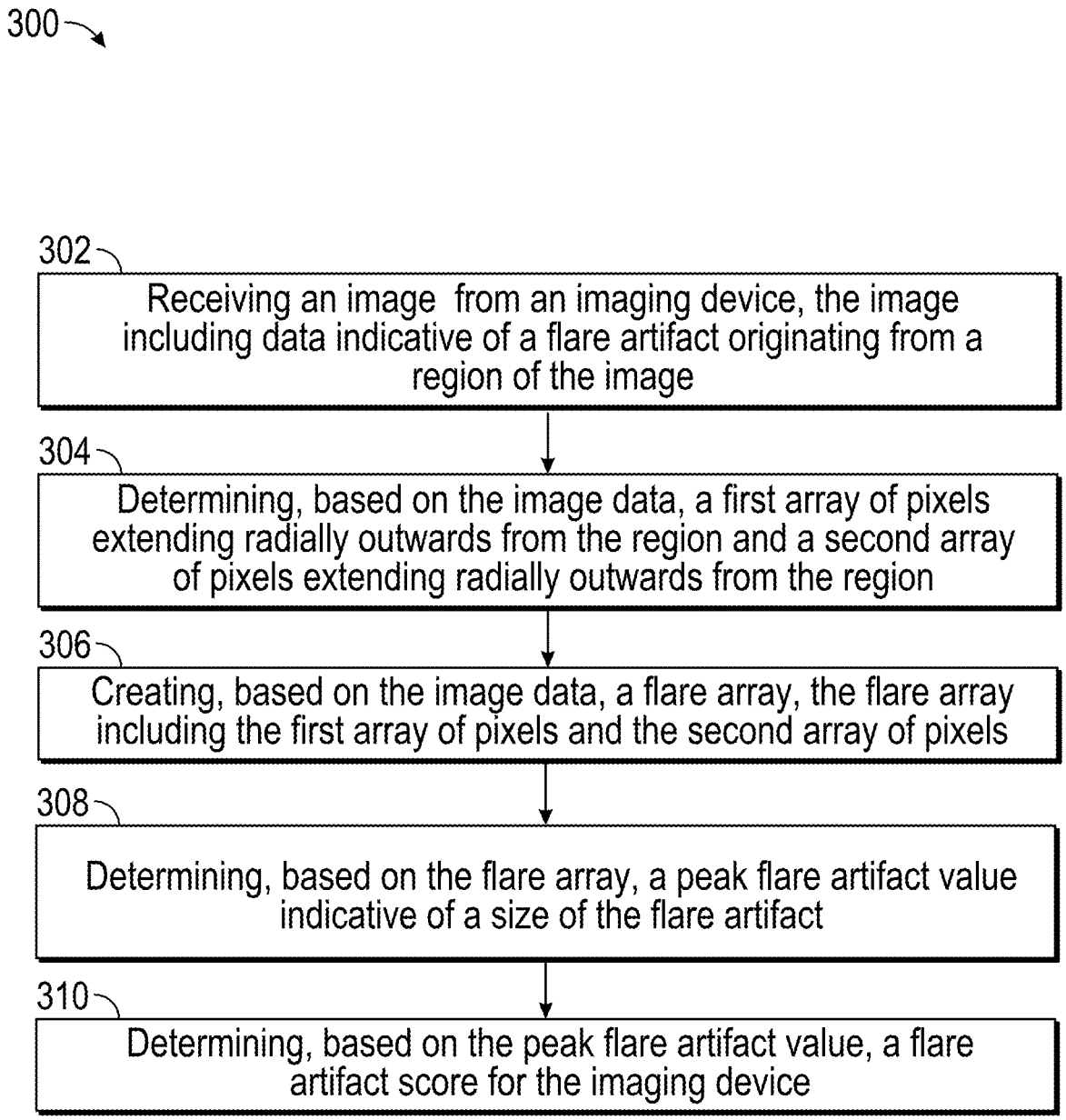
FIG. 3 depicts an example method in accordance with one or more example embodiments of the disclosure.

FIG. 3 is an example method 300 for in accordance with one or more example embodiments of the disclosure.

At block 302 of the method 300 in FIG. 3, the method may include receiving an image from an imaging device, the image including data indicative of a flare artifact originating from a region of the image. In some cases, the image may also be in the form of a video or a real-time stream of data. The image may include an image of a particular region in an environment, and the region may include a light source (for example, the sun) or other object that may be capable of producing flare artifacts in an image captured by the imaging device. In some cases, the image may include multiple images of the region within at environment at different orientations with respect to the region. For example, the system may capture three images at orientations of −20, 0, and 20 degrees from an angle of incidence. More than one orientation may be captured through the one or more images because flare artifacts may change depending on the location of the light source. For example, if the methods described herein are applied to multiple images at different orientations, the resulting metrics for each orientation may be sorted in order. The image with the highest resulting value (or lowest, depending on the metric used) can then be used as the resulting score for that particular imaging device. Again, flare artifacts can be orientation dependent, so it may be beneficial to take multiple images at multiple orientations and determine different metrics at these orientations to determine the level of flare artifacts produced by the imaging device in a worst case scenario. Although more than one orientation may be captured and processed in a manner as will be described below, for simplicity sake, the below descriptions may only exemplify the processing that may be performed on one of the images. The process described below may also similarly be applied to any number of additional images at any given orientation, and may be applied using only one image at one orientation with respect to the region of interest.

Block 304 of the method 300 may include determining, based on the image data, a first array of pixels extending radially outwards from the region and a second array of pixels extending radially outwards from the region. Block 306 of the method 300 may include creating, based on the image data, a flare array, the flare array including the first array of pixels and the second array of pixels. That is, in order to create the flare profile array from the image, each of the arrays of pixels extending radially outward from the light source may be extracted individually. Beginning with the array of pixels extending outward from the centroid of the light source at the center of the image (after zero padding) horizontally to the edge of the image (for example, as depicted in FIG. 1A), each of the arrays of pixels may be extracted by incrementally rotating the image in a counter-clockwise or clockwise direction by a single degree of rotation after each subsequent pixel array is extracted. This may be performed until all of the pixels of the image have been extracted and added to the flare profile array. For example, the array of pixels extending outward from the centroid of the light source at the center of the image may be extracted and added to the flare profile array as a first row. The zero-padded image may then be rotated by a single degree such that the array of pixels that was adjacent to the original array of pixels extending outward from one side of the light source at the center of the image may then take the place of the array of pixels extending outward from one side of the light source at the center of the image. This array of pixels may then be extracted and added to the flare profile array as a second row of pixels underneath the first row of pixels on the flare profile array. This process may continue until all of the pixels on the image have been translated into rows of pixels on the flare profile array. Again, this process may be better visualized through FIG. 1A described below. This process of extracting arrays of pixels may be a form of remapping the original image from Cartesian (x,y) coordinates to polar coordinates (radius, theta).

Block 308 of the method 300 may include determining, based on the flare array, a peak flare artifact value indicative of a size of the flare artifact. Block 310 of the method 300 may include determining, based on the peak flare artifact value, a flare artifact score for the imaging device.

The operations described and depicted in the illustrative process flow of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative System Architecture

Figure 4:
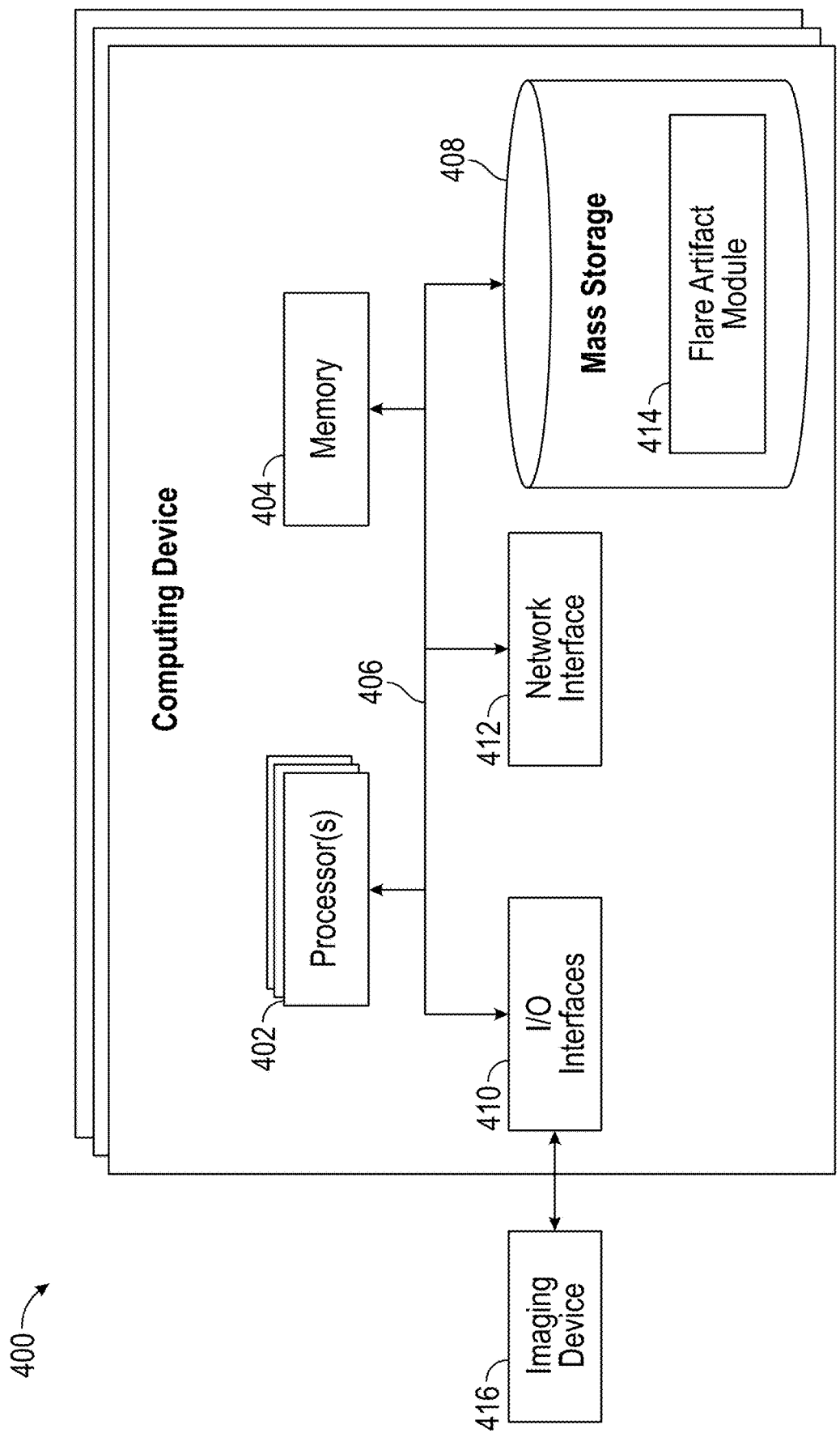
FIG. 4 depicts an example system architecture, in accordance with one or more example embodiments of the disclosure.

FIG. 4 illustrates an example computing device 400, in accordance with one or more embodiments of this disclosure. The computing device 400 may be a device used to perform any of the processing with respect to the flare artifact score determination or any other processing described herein. The computing device 400 may include at least one processor 402 that executes instructions that are stored in one or more memory devices (referred to as memory 404). The instructions can be, for instance, instructions for implementing functionality described as being carried out by one or more modules and systems disclosed above or instructions for implementing one or more of the methods disclosed above. The processor(s) 402 can be embodied in, for example, a CPU, multiple CPUs, a GPU, multiple GPUs, a TPU, multiple TPUs, a multi-core processor, a combination thereof, and the like. In some embodiments, the processor(s) 402 can be arranged in a single processing device. In other embodiments, the processor(s) 402 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 402 can access the memory 404 by means of a communication architecture 406 (e.g., a system bus). The communication architecture 406 may be suitable for the particular arrangement (localized or distributed) and type of the processor(s) 402. In some embodiments, the communication architecture 406 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile discs (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

In addition to storing executable instructions, the memory 404 also can retain data, such as any ledger 156 information, among other data.

Each computing device 400 also can include mass storage 408 that is accessible by the processor(s) 402 by means of the communication architecture 406. The mass storage 408 can include machine-accessible instructions (e.g., computer-readable instructions and/or computer-executable instructions). In some embodiments, the machine-accessible instructions may be encoded in the mass storage 408 and can be arranged in components that can be built (e.g., linked and compiled) and retained in computer-executable form in the mass storage 408 or in one or more other machine-accessible non-transitory storage media included in the computing device 400. Such components can embody, or can constitute, one or many of the various modules disclosed herein. Such modules are illustrated as node configuration modules 414.

Execution of the node configuration modules 414, individually or in combination, by at least one of the processor(s) 402, can cause the computing device 400 to perform any of the operations described herein (for example, the operations described with respect to FIG. 4, as well as any other operations).

Each computing device 400 also can include one or more input/output interface devices 410 (referred to as I/O interface 410) that can permit or otherwise facilitate external devices to communicate with the computing device 400. For instance, the I/O interface 410 may be used to receive and send data and/or instructions from and to an external computing device. The computing device 400 also includes one or more network interface devices 412 (referred to as network interface(s) 412) that can permit or otherwise facilitate functionally coupling the computing device 400 with one or more external devices. Functionally coupling the computing device 400 to an external device can include establishing a wireline connection or a wireless connection between the computing device 400 and the external device. The network interface devices 412 can include one or many antennas and a communication processing device that can permit wireless communication between a vehicle and either another vehicle or an external device. The other vehicle can be, for example, one of the vehicles included in the network or an out-of-network vehicle. The external device can be, for example, one of the mobile devices included in the network. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like.

In some embodiments, the computing device 400 may be in communication with an imaging device 416 (for example, through the I/O interface 410 of the computing device as shown in FIG. 4). The imaging device 416 may be the same as any of the imaging devices described herein (for example, an imaging device for which a flare artifact score is determined based on one or more images that the imaging device captures).

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

That which is claimed is:

1. A system, comprising:
    a processor; and
    a memory storing computer-executable instructions, that when executed by the processor, cause the processor to:
        receive an image from an imaging device, the image including data indicative of a flare artifact originating from a region of the image;
        determine, based on the image data, a first array of pixels extending radially outwards from the region and a second array of pixels extending radially outwards from the region;
        create, based on the image data, a flare array, the flare array including the first array of pixels and the second array of pixels;
        determine, based on the flare array and a mean value of the first array of pixels and a mean value of the second array of pixels, a peak flare artifact value indicative of a size of the flare artifact; and
        determine, based on the peak flare artifact value, a flare artifact score for the imaging device.

2. The system of claim 1, wherein the computer-executable instructions further cause the processor to:
    determine a center of a source of the flare artifact; and
    modify the image so that the center of the source of the flare artifact is at a center of the image, wherein modifying the image further comprises adding one or more additional pixels to the image, wherein a location of the one or more additional pixels is based on the determined center of the source of the flare artifact.

3. The system of claim 2, wherein determining the center of a source of the flare artifact in the image further comprises creating a binary map of the image, wherein pixel values above a threshold are given a first value and pixels values below the threshold are given a second value.

4. The system of claim 1, wherein the flare array further comprises a first column of pixels, and wherein the computer-executable instructions further cause the processor to:
    determine a first median pixel value for the first column of pixels; and
    subtract the first median pixel value from the first column of pixels, wherein subtracting the median pixel value separates higher frequency flare artifacts from lower frequency background glare in the image.

5. The system of claim 1, wherein creating the flare array further comprises:
    copy the first array of pixels from the image to the flare array;
    rotate the image in either a clockwise direction or a counterclockwise direction by a degree of rotation; and
    copy the second array of pixels from the image to the flare array.

6. The system of claim 1, wherein the computer-executable instructions further cause the processor to:
    receive, from the imaging device, a second image including the flare artifact originating from the region of the image, the second image being at a different orientation than the image;
    determine a second flare artifact score for the imaging device based on the second image; and
    determine, based on the flare artifact score based on the image and the second flare artifact score based on the second image, an overall flare artifact score for the imaging device.

7. A method, comprising:
    receiving an image from an imaging device, the image including data indicative of a flare artifact originating from a region of the image;
    determining, based on the image data, a first array of pixels extending radially outwards from the region and a second array of pixels extending radially outwards from the region;
    creating, based on the image data, a flare array, the flare array including the first array of pixels and the second array of pixels;
    determining, based on the flare array and a mean value of the first array of pixels and a mean value of the second array of pixels, a peak flare artifact value indicative of a size of the flare artifact; and
    determining, based on the peak flare artifact value, a flare artifact score for the imaging device.

8. The method of claim 7, further comprising:
determining a center of a source of the flare artifact; and
modifying the image so that the center of the source of the flare artifact is at a center of the image, wherein modifying the image further comprises adding one or more additional pixels to the image, wherein a location of the one or more additional pixels is based on the determined center of the source of the flare artifact.

9. The method of claim 8, wherein determining the center of a source of the flare artifact in the image further comprises creating a binary map of the image wherein pixel values above a threshold are given a first value and pixels values below the threshold are given a second value.

10. The method of claim 7, wherein the flare array further comprises a first column of pixels, and wherein the method further comprises:
determining a first median pixel value for the first column of pixels; and
subtracting the median pixel value from the first column of pixels, wherein subtracting the median pixel value separates higher frequency flare artifacts from lower frequency background glare in the image.

11. The method of claim 7, wherein creating the flare array further comprises:
copying the first array of pixels from the image to the flare array;
rotating the image in either a clockwise direction or a counterclockwise direction by a degree of rotation; and
copying the second array of pixels from the image to the flare array.

12. The method of claim 7, further comprising:
receiving, from the imaging device, a second image including the flare artifact originating from the region of the image, the second image being at a different orientation than the image;
determining a second flare artifact score for the imaging device based on the second image; and
determining, based on the flare artifact score based on the image and the second flare artifact score based on the second image, an overall flare artifact score for the imaging device.

13. A non-transitory computer readable medium including computer-executable instructions stored thereon, which when executed by one or more processors, cause the one or more processors to perform operations of:
receiving an image from an imaging device, the image including data indicative of a flare artifact originating from a region of the image;
determining, based on the image data, a first array of pixels extending radially outwards from the region and a second array of pixels extending radially outwards from the region;
creating, based on the image data, a flare array, the flare array including the first array of pixels and the second array of pixels;
determining, based on the flare array and a mean value of the first array of pixels and a mean value of the second array of pixels, a peak flare artifact value indicative of a size of the flare artifact; and
determining, based on the peak flare artifact value, a flare artifact score for the imaging device.

14. The non-transitory computer readable medium of claim 13, wherein the computer-executable instructions are further configured to cause the one or more processors to perform operations of:
determining a center of a source of the flare artifact; and
modifying the image so that the center of the source of the flare artifact is at a center of the image, wherein modifying the image further comprises adding one or more additional pixels to the image, wherein a location of the one or more additional pixels is based on the determined center of the source of the flare artifact.

15. The non-transitory computer readable medium of claim 14, wherein determining the center of a source of the flare artifact in the image further comprises creating a binary map of the image wherein pixel values above a threshold are given a first value and pixels values below the threshold are given a second value.

16. The non-transitory computer readable medium of claim 13, wherein the flare array further comprises a first column of pixels, and wherein the computer-executable instructions are further configured to cause the one or more processors to perform operations of:
determining a first median pixel value for the first column of pixels; and
subtracting the median pixel value from the first column of pixels, wherein subtracting the median pixel value separates higher frequency flare artifacts from lower frequency background glare in the image.

17. The non-transitory computer readable medium of claim 13, wherein creating the flare array further comprises:
copying the first array of pixels from the image to the flare array;
rotating the image in either a clockwise direction or a counterclockwise direction by a degree of rotation; and
copying the second array of pixels from the image to the flare array.

18. The system of claim 1, further comprising the imaging device, wherein the imaging device comprises at least one camera.

19. The method of claim 7, further comprising:
prompting a user to clean the imaging device based on the flare artifact score.

20. The non-transitory computer readable medium of claim 13, wherein the imaging device is disposed on a vehicle, and wherein the computer-executable instructions are further configured to cause the one or more processors to perform operations of:
triggering a cleaning mechanism to clean the imaging device based on the flare artifact score.

* * * * *